US008559349B2

(12) United States Patent
Ruiz Lopez et al.

(10) Patent No.: US 8,559,349 B2
(45) Date of Patent: Oct. 15, 2013

(54) WIRELESS NETWORK DEVICES CONFIGURABLE VIA POWERLINE COMMUNICATIONS NETWORKS

(75) Inventors: David Ruiz Lopez, Barcelona (ES); Josemaria Ogara Fernandez de Arroyabe, Barcelona (ES); Juan Carlos Riveiro Insua, Valencia (ES); Jonathan E. D. Hurwitz, Edinburgh (GB)

(73) Assignee: Broadcom Corporation, Irvine, CA (US)

( * ) Notice: Subject to any disclaimer, the term of this patent is extended or adjusted under 35 U.S.C. 154(b) by 148 days.

(21) Appl. No.: 13/097,978

(22) Filed: Apr. 29, 2011

(65) Prior Publication Data
US 2011/0317603 A1 Dec. 29, 2011

(30) Foreign Application Priority Data
Apr. 29, 2010 (GB) .................................. 1007146.2

(51) Int. Cl.
*G08C 17/00* (2006.01)
(52) U.S. Cl.
USPC ............................ 370/311; 370/331; 370/329
(58) Field of Classification Search
None
See application file for complete search history.

(56) References Cited

U.S. PATENT DOCUMENTS

| | | | |
|---|---|---|---|
| 6,657,981 B1 * | 12/2003 | Lee et al. ...................... 370/331 |
| 2005/0015805 A1 * | 1/2005 | Iwamura .......................... 725/79 |
| 2005/0047379 A1 * | 3/2005 | Boyden et al. ................ 370/338 |
| 2005/0085259 A1 | 4/2005 | Conner et al. |
| 2007/0055414 A1 * | 3/2007 | Darji ................................ 701/2 |
| 2007/0201540 A1 * | 8/2007 | Berkman ....................... 375/219 |
| 2008/0259888 A1 | 10/2008 | Terashima |

FOREIGN PATENT DOCUMENTS

| | | |
|---|---|---|
| CN | 1787452 | 6/2006 |
| CN | 1829165 | 9/2006 |
| EP | 0822721 A2 | 4/1998 |
| EP | 2034751 A1 | 11/2009 |
| EP | 2134112 A1 | 12/2009 |
| GB | 2407938 A | 11/2005 |
| JP | 2002319947 A | 10/2002 |

OTHER PUBLICATIONS

Search Report: GB1007146.2 dated Sep. 7, 2010.
European Search Report: EP11003531.8 dated Aug. 11, 2011, 3 pages.

* cited by examiner

*Primary Examiner* — David Oveissi
(74) *Attorney, Agent, or Firm* — Garlick & Markison; Bruce E. Garlick

(57) ABSTRACT

A communications device includes a wireless communications interface, a power line carrier (PLC) communications interface, and processing circuitry coupled to the wireless communications interface and to the PLC communications interface. The processing circuitry, in combination with at least one of the wireless communications interface and the PLC communications interface is operable to send a request for wireless communications interface operational parameters via the PLC communications interface, receive a response via the PLC communications interface, the response including wireless communications interface operational parameters corresponding to a wireless network, and configure wireless communications interface based upon response. In another operation, the processing circuitry is operable to listen for transmissions of at least one Wireless Access Point (WAP) of the wireless network. When transmissions of the at least one the WAP of the wireless network meets a sufficiency threshold, receive data service via the wireless communications interface and when the transmissions of the at least one the WAP of the wireless network fail to meet the sufficiency threshold, receive data service via the PLC communications interface.

24 Claims, 6 Drawing Sheets

WIRELESS NETWORK DEVICES CONFIGURABLE VIA POWERLINE COMMUNICATIONS NETWORKS

CROSS-REFERENCE TO PRIORITY APPLICATION

The present application claims priority under 35 U.S.C. 119(a) to Great Britain Provisional Application No. 1007146.2, filed Apr. 29, 2010, which is incorporated herein by reference in its entirety for all purposes.

FIELD OF THE INVENTION

The present invention relates to communications devices and network devices, and more particularly to communications devices being programmed for particular network configurations.

BACKGROUND TO THE INVENTION

It is known to provide for data communications between and amongst multi-media devices, which are installed, for example, in a residential or commercial building, by means of a communications network. The multi-media devices might, for example, be Network Attached Storage (NAS), a Home Gateway (HGW), a Personal Computer (PC), and a Set-Top Box (STB). Communication between and amongst such multi-media devices is by means of a medium interface circuit at each multi-media devices (or node) with the medium interface circuits being operative to communicate data from node to node over an appropriate medium. The medium interface circuit may be operative to transmit and receive data over one or more of powerlines, telephone lines and coaxial cables.

Wireless Fidelity (WiFi) communications are in widespread use in residential and commercial environments. For example, a WiFi communications link may be established between a multi-media network and a laptop. Invariably there is some form of security built into a WiFi link. For example, in the 802.11 WiFi standard a particular wireless Local Area Network (LAN) is identified by a unique Service Set Identifier (SSID) with communication of data packets between and amongst LAN nodes requiring use of an SSID unique to the LAN. Furthermore, every LAN node sharing the same SSID may be configured to require a password for encryption to thereby secure data integrity and confidentiality from unauthorised access. It will be appreciated that the security of WiFi links is important given the greater accessibility to other parties that WiFi affords compared with more inherently secure copper or fibre optic links.

When a WiFi access point or router is being configured in a network, the normal approach is to connect a computer to the WiFi access point or router by means of an Ethernet cable and to configure the WiFi access point or router by way of a web-page interface or wizard running on the computer. Alternatively and where wireless communications with the WiFi access point or router is open, a wireless connection may be established between the computer and the WiFi access point or router instead of relying on an Ethernet cable connection. Each further wireless enabled node in the network may be configured in the same fashion. Alternatively, each further network node may be configured by downloading configuration data from a USB device. Another approach that is employed in a suitably configured network is user actuation of a pairing push button of each of an already configured node and a node to be configured to initiate the transfer of the configuration data to the node to be configured with the process being repeated for each of the further nodes.

BRIEF DESCRIPTION OF DRAWINGS

Further features and advantages of the present invention will become apparent from the following specific description, which is given by way of example only and with reference to the accompanying drawings, in which.

DETAILED DESCRIPTION

Figure 1:
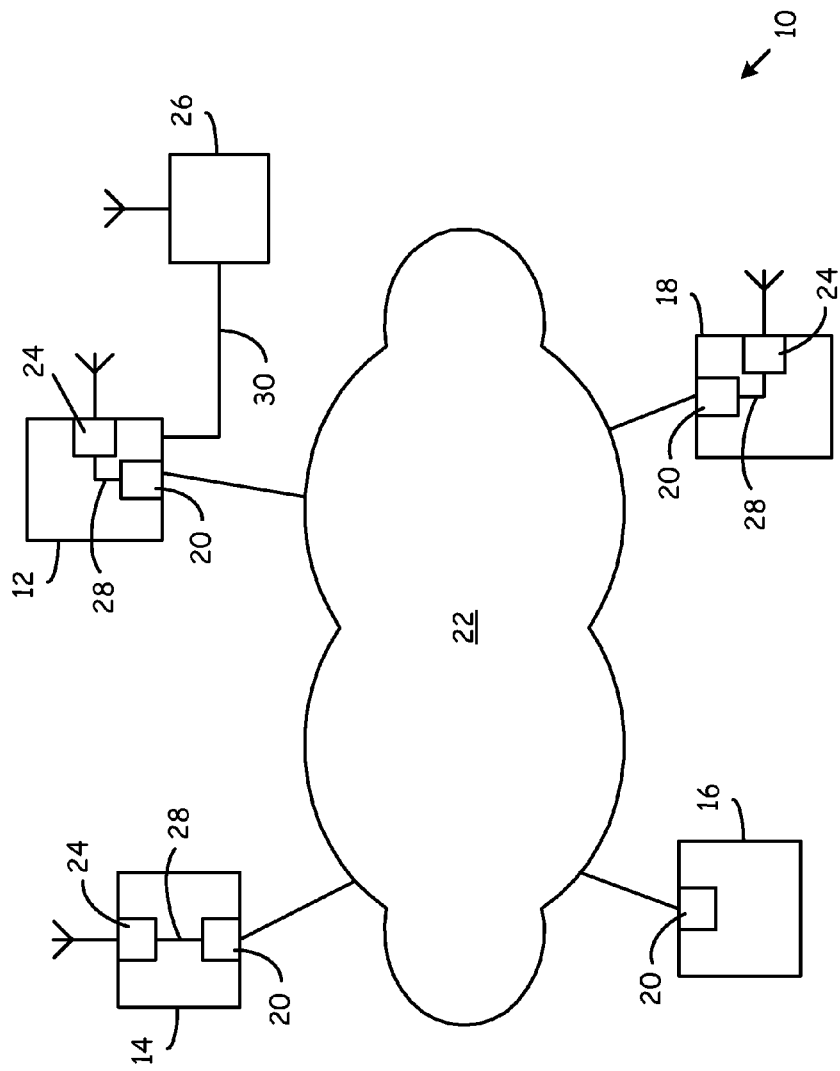
FIG. 1 illustrates a communications network constructed according one or more embodiments of the present invention.

According to a first aspect of the present invention communications devices form a communications network, the communications devices including a first medium interface circuit that is 802.11 compliant and which is configured to, in use, communicate data through air and over a powerline medium and a second medium interface circuit that is 802.11 compliant and which is configured to, in use, communicate data through air and over the powerline medium. The first and second medium interface circuits are operative to convey configuration data from the first medium interface circuit to the second medium interface circuit over the powerline medium in dependence on a configuration of the first medium interface circuit being changed, the second medium interface circuit being further operative to change its configuration in dependence on received configuration data, whereby the first and second medium interface circuits have a same configuration.

In use, the configuration, such as in respect of the SSID or a password, is changed at the first medium interface circuit. For example, a user may change the configuration by means of one of the known approaches described above, such as a wizard or web-page running on a computer that is connected to the first medium interface circuit by way of an Ethernet cable. When the configuration is changed, configuration data is conveyed over the powerline medium to the second medium interface circuit, which is thereby operative to adapt its configuration to that of the first medium interface circuit. Hence, the user is no longer required to carry out repetitive operations to ensure that the changed configuration data is copied through a network. Furthermore, the use of the powerline medium for conveying configuration data from the first medium interface circuit to the second medium interface circuit avoids the need to use WiFi, i.e. according to a 802.11 compliant approach, which tends to be problematic in view of the need to have matching SSIDs before communications can take place between the medium interface circuits or between a WiFi enabled computer and the second medium interface circuit.

Alternatively or in addition, the communications devices may be at least a third medium interface circuit that is 802.11 compliant and which is configured to, in use, communicate data through air and over the powerline medium. The first medium interface circuit and the at least third medium interface circuit may be operative to convey configuration data from the first or second medium interface circuit to the third medium interface circuit over the powerline medium in dependence on a configuration of the first medium interface circuit being changed, the third medium interface circuit being further operative to change its configuration in dependence on received configuration data, whereby the first and third medium interface circuits have a same configuration. Hence, a change in configuration of the first medium interface circuit may be copied to a plurality of other medium interface circuits in a network.

Alternatively or in addition, the communications devices may, in use, include a configuration software agent that is operative to determine whether or not a configuration of the first medium interface circuit has changed, e.g. whether or not the SSID has changed. Also, the configuration software agent may be operative to effect conveyance of the configuration data from the first medium interface circuit to the second medium interface circuit. Where the communications devices further include medium interface circuits, the configuration software agent may be operative to effect conveyance of the configuration data to the further medium interface circuits. The configuration software agent may be operative to determine whether or not a configuration of the first medium interface circuit has changed on a periodic basis. For example, the configuration software agent may be operative once a day on an autonomous basis to determine whether or not the configuration has changed.

Operation of the configuration software agent may be initiated in dependence upon a user operation. The user operation may be changing a configuration of the first medium interface circuit. Hence, the configuration software agent may be initiated in dependence on the configuration of the first medium interface circuit being changed and may be operative to copy the change in configuration through the network. Alternatively or in addition, the user operation may be an operation other than changing a configuration of the first medium interface circuit. Hence, the user operation may include actuating a switch, such as a push button switch, on solely one medium interface circuit, e.g. the first medium interface circuit. Thus and in contrast to the known approach there may be no need to actuate a push button on each of the medium interface circuits to effect copying of changed configuration data through the network.

Alternatively or in addition, the configuration data may include at least one of: an SSID; password data; identification data; channel selection data; medium select data (e.g. powerline or air); encryption format data; power saving configuration data; VLAN configuration data; and quality of service control data. Alternatively or in addition, the configuration data may be operative when conveyed through the network to change or reset a network key of at least one of WiFi communications circuits and powerline communications circuits of the network.

Alternatively or in addition, the medium interface nodes may be further configured to provide for changing configuration data through the network by at least one of the approaches described above. For example, each medium interface circuit may include a push button switch and configuration data may be copied from one medium interface circuit to another by pressing their respective push buttons.

Alternatively or in addition, the communications devices may include a third medium interface circuit that is configured to communicate over a powerline medium, 802.11, and/ or compliant and configured to communicate through air. The third medium interface circuit may be configured to communicate over a powerline medium and may be operative to convey configuration data from one of the first and second medium interface circuits to the third medium interface circuit over the powerline medium.

Alternatively or in addition, the first medium interface circuit may be operative to receive configuration data, such as a changed SSID or password, in dependence on a user action. Hence and according to an aspect of the present invention, there may be provided a communications network comprising communications devices according to the first aspect of the present invention and user operable devices that is operable to form configuration data in dependence on a user action and to convey the configuration data over the air to the first medium interface circuit. The user operable devices may, for example, be a WiFi enabled Personal Computer (PC), such as a laptop. The user operable devices may be operative to configure the first medium interface circuit in accordance with a known approach, e.g. one of the known approaches described above, such as by means of a web-page.

The communications network may be a multi-media network, e.g. installed or for installation in a residential or commercial building. The communications network may include at least one operative device, e.g. such that there is an operative device at each node. The operative devices may be heterogeneous devices. The devices may be heterogeneous as regards their configuration for different applications, e.g. one operative device may be a media player and another operative device may be a storage device. Alternatively or in addition, the operative devices may be for substantially a same application, e.g. media playing, but be heterogeneous as regards their different hardware or firmware configurations, e.g. a general purpose device, such as a PC, configured to play video and a dedicated video player. The operative devices may include at least one multi-media device, such as Network Attached Storage (NAS), a Home Gateway (HGW), a Personal Computer (PC), and a Set-Top Box (STB).

According to another aspect of the present invention, there is provided a method of changing a configuration of at least a second of a plurality of medium interface circuits in a communications network, each of the plurality of medium interface circuits being 802.11 compliant and being configured to, in use, communicate data through air and over a powerline medium. The method includes changing a configuration of a first medium interface circuit, conveying configuration data from the first medium interface circuit to a second medium interface circuit over the powerline medium in dependence on a configuration of the first medium interface circuit being changed, and changing a configuration of the second medium interface circuit in dependence on the received configuration data, whereby the first and second medium interface circuits have a same configuration.

FIG. 1 shows a multi-media communications network 10 installed in a residential building. The network 10 includes first 12, second 14, third 16 and fourth 18 communications devices. Each of the first to fourth communications devices 12, 14, 16, 18 includes a powerline medium interface circuit 20 that is operative to provide for communication of media and associated control and configuration data over a powerline medium 22. The powerline medium interface circuit 20 is of known form and function. Thus, the powerline medium 22 provides for communication between and amongst the communication devices. Each of the first, second and fourth communications devices 12, 14, 18 includes a WiFi medium interface circuit 24. The WiFi medium interface circuit 24 is of known form and function in accordance with one of several WiFi standards, such as that described at http://standards.ieee.org/getieee802/download/802.11-2007.pdf. The WiFi medium interface circuits 24 provide for WiFi communications between and amongst the first, second and fourth communications devices 12, 14, 18. The network 10 of FIG. 1 also includes a WiFi enabled laptop 26, which is operative to provide for WiFi communication between the laptop and the first, second and fourth communications devices 12, 14, 18. As can be seen from FIG. 1, there is a communications link 28 between the powerline medium interface circuit 20 and the WiFi medium interface circuit 24 in each of the first, second and fourth communications devices 12, 14, 18. The communications link 28 represents means of communicating data between the WiFi and powerline circuits of each communications devices. The means whereby data is communicated between the WiFi and powerline circuits is known and the design of software to effect such communication is within the ordinary design capabilities of the person of ordinary skill in the art.

Figure 2:
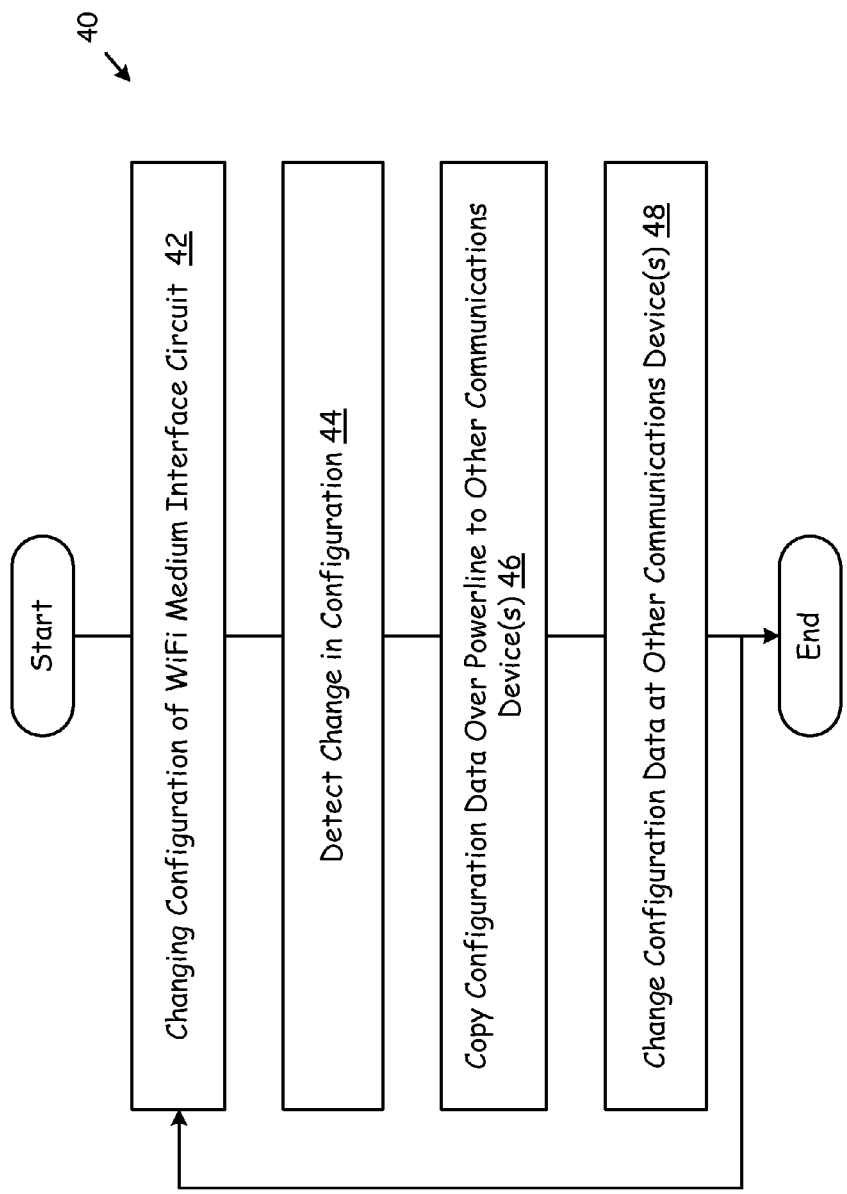
FIG. 2 is a flow chart representation of steps involved in configuring the communications network of FIG. 1 according to one or more embodiments of the present invention.

The changing of a configuration of the network 10 shown in FIG. 1 will now be described with reference to the operations 40 of the flow chart shown in FIG. 2. The first step involves changing a configuration of the WiFi medium interface circuit 24 of the first communications devices 12 by means of the laptop 26, 42. This step is in accordance with the known approaches described above of establishing a WiFi link between the laptop 26 and the first communications devices 12 where the WiFi link is open or connecting the laptop 26 to the first communications devices 12 using a direct Ethernet cable 30 and using a wizard or a web-page interface to effect the change in configuration. An example of a configuration change is in respect of the SSID. Other configuration changes might relate to features of operation of the first communications devices 12 in general and not solely the WiFi medium interface circuit, such as WiFi channel select data, encryption format data, power saving data, VLAN configuration data, quality of service data, password, etc. VLAN is a standard field in the Ethernet packet used in accordance with IEE 802.1Q. Details for IEE 802.1Q can be found at http://standards.ieee.org/getieee802/download/802.1Q-2005.pdf.

The next step involves detecting the change in configuration of the first communications devices 12, 44. In one form, a configuration software agent, which is resident in at least one the communications devices, periodically checks the configuration data of the first communications devices and if a change is detected the software agent initiates the copying of the changed data from the first communications devices to other communications devices in the network as appropriate depending on the type of configuration data changed. In another form, a configuration software agent is spawned by the user gaining access to the first communications devices 12 and is operative to detect a change in configuration data and initiate the copying 46 of the changed data from the first communications devices to other communications devices in the network. In yet another form, operation of a configuration software agent is initiated by actuating a push button on the first communications devices 12 or on any one of the other communications devices 14, 16, 18. Similarly the configuration software agent is operative to detect a change in configuration data and initiate the copying 46 of the changed data from the first communications devices to other communications devices in the network. In all forms, the configuration data is copied on an autonomous basis over the powerline medium 22 to each of the other communications devices 46. Hence, there may be no need to carry out the known, repetitive operations that are required to copy changed configuration data from one communications devices to the other communications devices in a network. The identities of the communications devices receiving and acting upon changed data will depend on the nature of the changed configuration data. For example, in the present example if the SSID is changed the changed SSID is copied to and acted upon by the second and fourth communications devices 14, 18, there being no need for a change in SSID of the third communications devices in view of it being configured for powerline communications only. A further example is a change in Quality of Service (QoS) rules for powerline and/or WiFi communications in the network. In this case, the change in QoS rules is copied to the second, third and fourth communications devices 14, 16, 18 because all the communications devices are configured for communication over the powerline medium 22.

When the changed configuration data is received at each of the appropriate communications devices, the receiving communications devices is operative to change its configuration data such that it is the same as the changed configuration data of the first communications devices 48. For example and according to the change in SSID example provided above, each of the second and fourth communications devices 14, 18 is operative to change its SSID to the SSID received over the powerline medium from the first communications devices 12. For example and according to the change in QoS rules example provided above, each of the second, third and fourth communications devices 14, 16, 18 is operative to change its QoS rules to the changed QoS rules received over the powerline medium from the first communications devices 12. Each of the communications devices includes a push button and is configured such that configuration data may be copied according to the known, push button approach described above instead of by the method described above with reference to FIG. 2.

Subsequent configuration changes to the first 12 or indeed to any one of the other communications devices 14, 16, 18 are detected and copied to the other communications devices in accordance with the method described above. The design of the configuration software agent and other software required to implement the above described method is within the ordinary design capabilities of the person skilled in the art.

Figure 3:
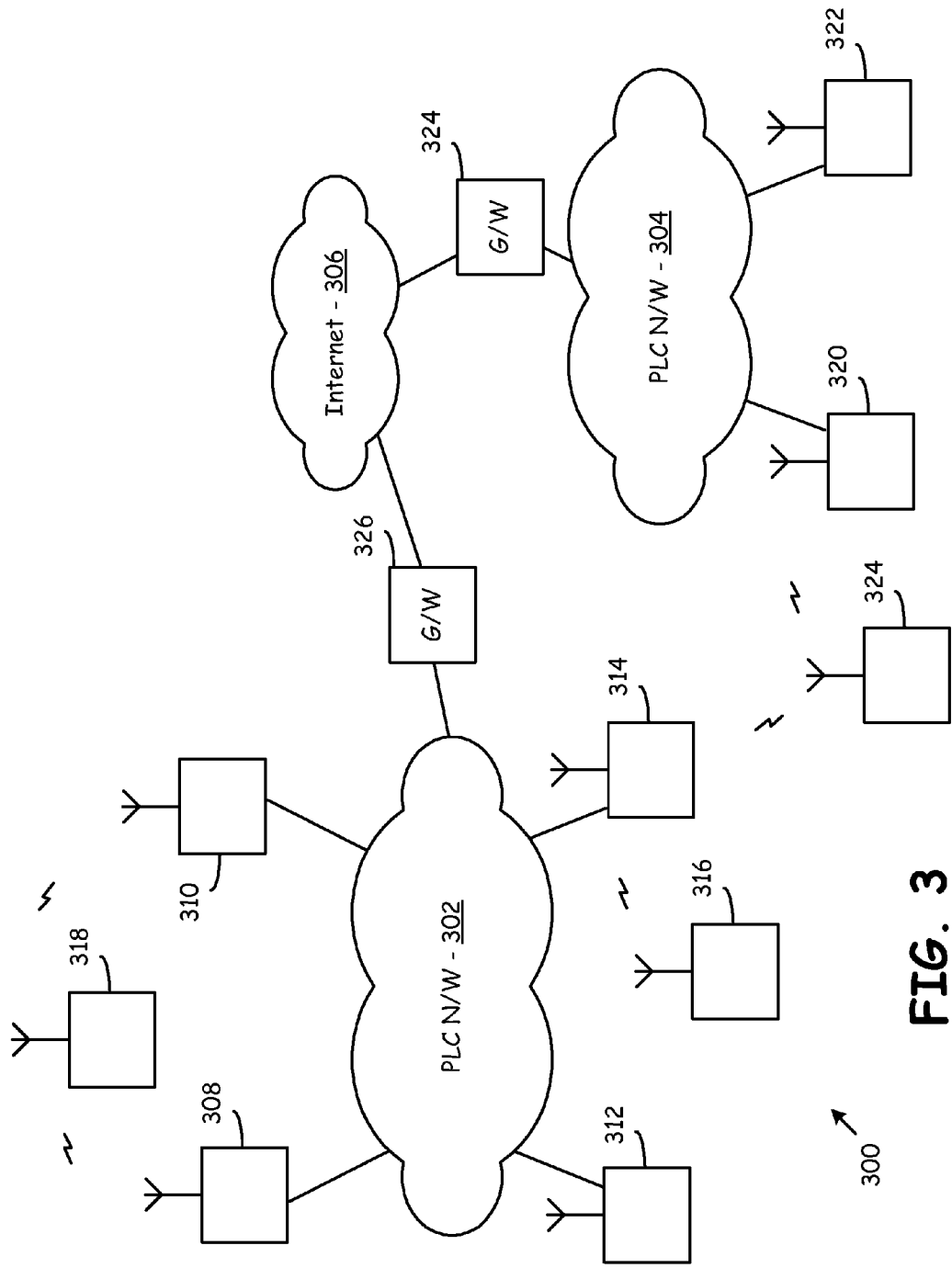
FIG. 3 is a system diagram illustrating a communications network constructed according one or more embodiments of the present invention.

FIG. 3 is a system diagram illustrating a communications network 300 constructed according one or more embodiments of the present invention. The communications network 300 includes Powerline Carrier (PLC) networks 302 and 304, which couple to the Internet 306 via gateways 326 and 324. The communication link between the Internet 306 and the PLC networks 302 and 304 may be wired such as via cable modem plant, optical plant, Ethernet plant, etc. with requisite service provider links or via one or more wireless links such as a satellite network link, a Wireless Wide Area Network (WWAN) link, point top point wireless link, or another type of wireless link. In any case, the gateways 324 and/or 326 provide data service accessible to the PLC networks 302 and 304. In another embodiment, the PLC networks 302 and/or 304 do not have data service provided thereto by the gateways 324 and/or 326 but have data service provided thereto by one or more of the combination PLC/wireless devices, referred to herein further as communication devices.

Figure 6:
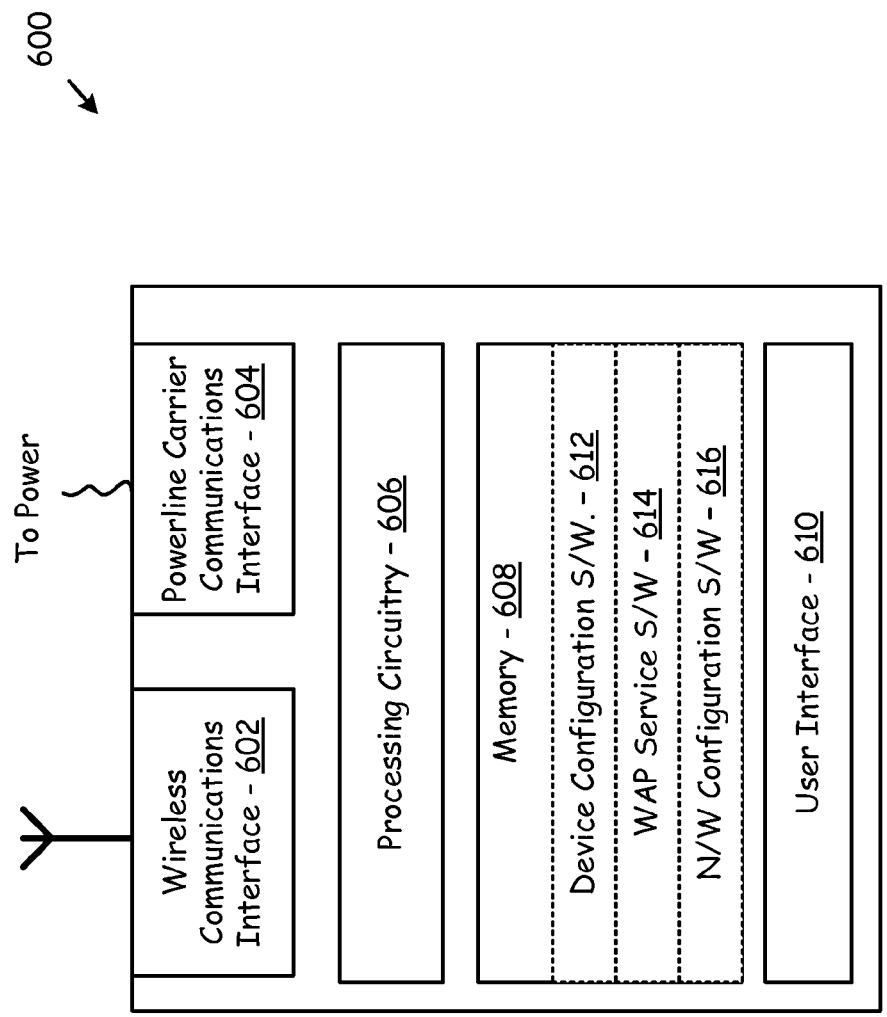
FIG. 6 is a block diagram illustrating a communications device constructed according to one or more embodiments of the present invention.

Communication devices 308, 310, 312, 314, 320, and 322 constructed and operating according to the present invention each include a wireless communications interface, a PLC communications interface, processing circuitry, and other components, some of which are further described herein with reference to FIG. 6. Each of these communication devices 308, 310, 312, 314, 320, and 322 couples to one or more respective PLC networks, e.g., 302 and/or 304. Each of these communication devices 308, 310, 312, 314, 320, and 322 is capable of communicating according to one or more wireless communication interface protocols, e.g., 802.11, Bluetooth, Cellular, 60 GHz, etc. as well as communicating according to one or more PLC communication protocols.

The communication devices 308, 310, 312, 314, 320, and 322 may be personal computers, tablet computers, data terminals, cellular telephones, Wireless Access Points (WAPs), or another of the types of devices described herein. One or more of these devices may provide wireless service to wireless devices 316, 318, and 324, which may be gaming devices, wireless terminals, cellular telephones, WiFi phones, etc.

According to one aspect of the present invention, a communications device, e.g., device 310 is operable to send a request for wireless communications interface operational parameters via its PLC communications interface. The device 310 is then operable to receive a response via the PLC communications interface, the response including wireless communications interface operational parameters corresponding to a wireless network. Finally, the device 310 is operable to configure its wireless communications interface based upon response. Any of the various particular operations described herein may be employed by this device 310 in its operations.

The communications device 310 may send the request upon one or more of power-up, restart, reset, upon the expiration of a timer, and/or upon user initiation. The communications device 310 may further be operable to determine a timeout condition when the response is not received, establish default wireless operational parameters upon the timeout condition, and configure the wireless communications interface with the default operational parameters. In such case, the communications device 310 will not receive wireless network details via the PLC interface but may propagate such network details to other communications devices later via the PLC interface. In such case, the communications device is further operable to receive a request for wireless communications interface operational parameters via the PLC communications interface, to prepare a response that includes the default wireless operational parameters, and to transmit a response via the PLC communications interface that includes the default operational parameters.

The wireless operational parameters may include one or more of an SSID, password data, identification data, channel selection data, medium select data, encryption format data, power saving configuration data, VLAN configuration data, and quality of service control data. In still further operations, the communications device 310 may be further operable to transmit a system configuration message to change or reset a network key for the wireless network. Moreover, the communications device may be further operable to manage handoff of a serviced wireless client to a second communications device of the wireless network via communications with the second communications device via the PLC communications interface.

In still another operation according to the present invention, a communications device, e.g., device 320, is operable to send a request for wireless communications interface operational parameters via the PLC communications interface. In response thereto, the device 320 is operable to receive a response via the PLC communications interface, the response including wireless communications interface operational parameters corresponding to a wireless network. The device 320 is the operable to listen for transmissions of at least one WAP of the wireless network, e.g., WAP 322. When transmissions of the at least one the WAP of the wireless network meets a sufficiency threshold, the communications device 320 receives data service via the wireless communications interface. However, when the transmissions of the at least one the WAP of the wireless network fails to meet the sufficiency threshold, the communications device receives data service via the PLC communications interface.

In one particular operation, the communications device 320 is further operable to enable the wireless communications interface to service data service for at least one other communications device, e.g., communications device 324. In providing such service, the communications device 320 may be further operable to enable the wireless communications interface to provide data service as a WAP of the wireless network. In such case, the communications device may be further operable to transmit its wireless communications interface operational parameters to potential client devices.

The PLC N/Ws 302 and 304 may service different dwellings in a multi-unit dwelling complex. Alternately, the PLC N/Ws 302 and 304 may service different homes that are adjacent or otherwise proximate to one another. In such case, privacy of communications is desirable. In such case, the communications device 320 or 314, for example, is further operable to coordinate transmit power of the wireless communications interface with transmit power of other communications devices of the wireless network via power level coordination communication messages transmitted and received via the PLC communications interface. In such case, coverage within a dwelling is provided but transmit power is limited so as not to transmit communications beyond a desired range.

Further, operations according to the present invention support efficient traffic routing of communications of traffic within a premises that a serviced device, e.g., 316, frequents. In such case, routing tables may be distributed via the PLC N/Ws 302 and 304 so that traffic may be efficient routed to the serviced device that moves about the premises but that typically stays in range of the WAPs 308, 310, 312 and 314 of the serviced WLAN.

Figure 4:
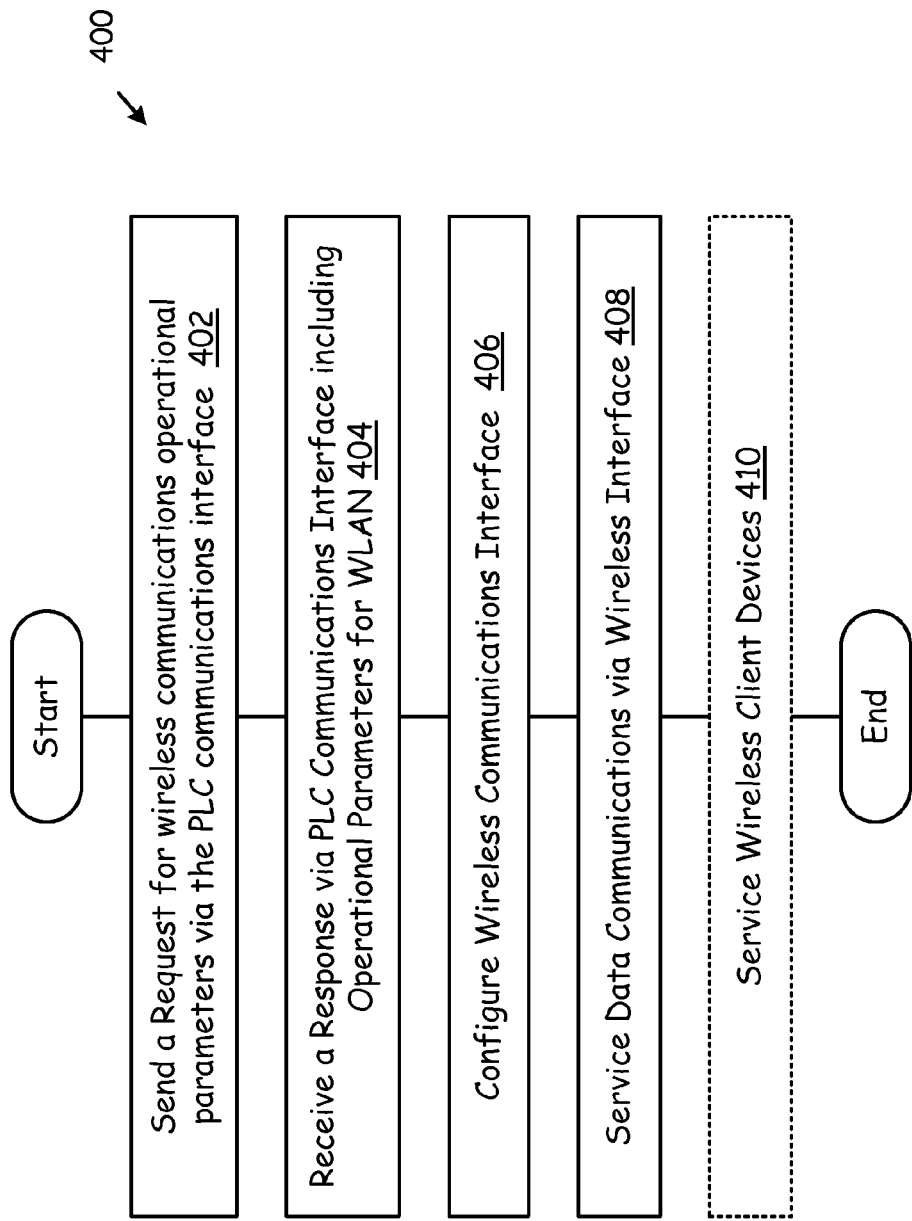
FIG. 4 is a flow chart illustrating operations of according to one or more embodiments of the present invention.

FIG. 4 is a flow chart illustrating operations of according to one or more embodiments of the present invention. The operations 400 of FIG. 4 commence with a communications device sending a request for wireless communications interface operational parameters via the PLC communications interface (Step 402). The communications device then receives a response via the PLC communications interface, the response including wireless communications interface operational parameters corresponding to a wireless network (Step 404). Then communications device then configures its wireless communications interface based upon response (Step 406). The communications device may then service data communications via its wireless interface using the configurations made (Step 408). In doing so, the communications device may service not only its own communications needs but also the communications needs of serviced client devices (Step 410). The various alternate operations of the communications device that were previously described may also be implemented with the operations 400 of FIG. 4.

Figure 5:
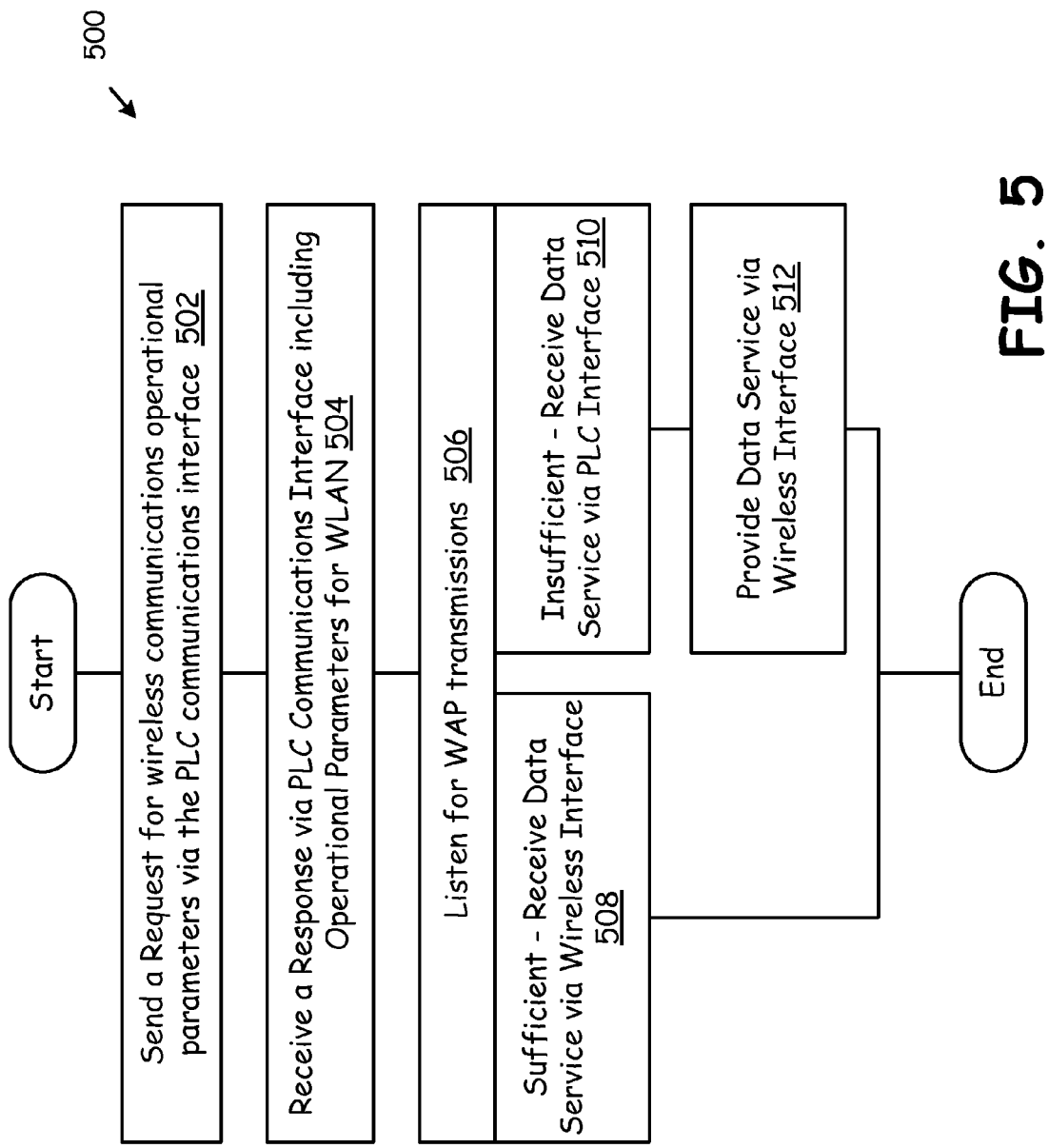
FIG. 5 is a flow chart illustrating operations of according to one or more embodiments of the present invention.

FIG. 5 is a flow chart illustrating operations of according to one or more embodiments of the present invention. The operations 500 of FIG. 5 commence with a communications device sending a request for wireless communications interface operational parameters via the PLC communications interface (Step 502). Operations continue with the communications device receiving a response via the PLC communications interface, the response including wireless communications interface operational parameters corresponding to a wireless network (Step 504). The communications device then listens for transmissions of at least one Wireless Access Point (WAP) of the wireless network (Step 506). When transmissions of the at least one the WAP of the wireless network meets a sufficiency threshold, the communications device receives data service via the wireless communications interface (Step 508). However, when the transmissions of the at least one the WAP of the wireless network fail to meet the sufficiency threshold, the communications device receives data service via the PLC communications interface (Step 510). In accomplishing these operations, the communications device may provide service data service for at least one other communications device (Step 512).

In accomplishing the operations 500 of FIG. 5, the communications device may provide data service as a WAP of the wireless network. In doing so, the communications device may transmit its wireless communications interface operational parameters to potential client devices. Further, the communications device may coordinate transmit power of the wireless communications interface with transmit power of other communications devices of the wireless network via power level coordination communication messages transmitted and received via the PLC communications interface.

FIG. 6 is a block diagram illustrating a communications device constructed according to one or more embodiments of the present invention. The communications device 600 includes one or more wireless communications interfaces 602, a PLC communications interface 604, processing circuitry, memory 608 and a user interface 610. The wireless communications interfaces 602 may support WiFi (802.11) WLAN standards, one or more cellular communications standards, the Bluetooth standard, one or more 60 GHz communication standards, one or more infrared standards, and may support other wireless communications as well. The PLC communications interface 604 supports at least PLC communication standard. The processing circuitry 606 may be one or more system processors, digital signal processors, one or more application specific integrated circuits, custom logic, a programmable gate array, or another type of digital or combination digital/analog circuit that is capable of executing software instructions and processing data.

The memory 608 may be one more of RAM, ROM, flash memory, optical memory, magnetic memory, or another type of memory that is capable of storing software instructions and data. The memory 608 stores various software instructions and data, including device configuration software 612, WAP service software 614, network configuration software 616, and also other software instructions for operating the communications device 600. The communications device 600 also includes a user interface that may include a keyboard, mouse, a display, a touch pad, one or more buttons, speakers, a microphone, and/or other components that allows as user to interface with the communications device to accomplish the operations of the present invention and other operations.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A communications device comprising:
    a wireless communications interface;
    a power line carrier (PLC) communications interface;
    processing circuitry coupled to the wireless communications interface and to the PLC communications interface, the processing circuitry, in combination with at least one of the wireless communications interface and the PLC communications interface operable to:
    send a request for wireless communications interface operational parameters via the PLC communications interface to a differing communications device;
    receive a response via the PLC communications interface from the differing communications device, the response including wireless communications interface operational parameters corresponding to a wireless network;
    configure the wireless communications interface based upon the response; and
    communicate with the differing communications device via both the wireless communications interface and the PLC communications, communications routed to the differing communications device via the wireless communications interface and the PLC communications interface based upon service quality available via the interfaces.

2. The communications device of claim 1, wherein the processing circuitry is operable to send the request upon one of:
    power-up;
    restart;
    reset;
    timer expiration; and
    user initiation.

3. The communications device of claim 1, wherein the processing circuitry is further operable to:
    determine a timeout condition when the response is not received;
    establish default wireless operational parameters upon the timeout condition; and
    configure the wireless communications interface with the default operational parameters.

4. The communications device of claim 3, wherein the processing circuitry is further operable to:
    receive a request for wireless communications interface operational parameters via the PLC communications interface; and
    prepare a response that includes the default wireless operational parameters; and
    transmit a response via the PLC communications interface that includes the default operational parameters.

5. The communications device of claim 1, wherein the wireless operational parameters comprise at least one of:
    an SSID;
    password data;
    identification data;
    channel selection data;
    medium select data;
    encryption format data;
    power saving configuration data;
    VLAN configuration data; and
    quality of service control data.

6. The communications device of claim 1, wherein the processing circuitry is further operable to transmit a system configuration message to change or reset a network key for the wireless network.

7. The communications device of claim 1, wherein the processing circuitry is further operable to manage handoff of a serviced wireless client to a second communications device of the wireless network via communications with the second communications device via the PLC communications interface.

8. A method for operating a communications device having a wireless communications interface, a power line carrier (PLC) communications interface, and processing circuitry coupled to the wireless communications interface and to the PLC communications interface, the method comprising:
    sending a request for wireless communications interface operational parameters via the PLC communications interface to a differing communications device;
    receiving a response via the PLC communications interface from the differing communications device, the response including wireless communications interface operational parameters corresponding to a wireless network;
    configuring the wireless communications interface based upon the response; and
    communicating with the differing communications device via both the wireless communications interface and the PLC communications, communications routed to the differing communications device via the wireless communications interface and the PLC communications interface based upon service quality available via the interfaces.

9. The method of claim 8, further comprising sending the request upon one of:
    power-up;
    restart;
    reset;
    timer expiration; and
    user initiation.

10. The method of claim 8, further comprising:
    determining a timeout condition when the response is not received;
    establishing default wireless operational parameters upon the timeout condition; and
    configuring the wireless communications interface with the default operational parameters.

11. The method of claim 10, further comprising:
    receiving a request for wireless communications interface operational parameters via the PLC communications interface; and
    preparing a response that includes the default wireless operational parameters; and
    transmitting the response via the PLC communications interface.

12. The method of claim 8, wherein the wireless operational parameters comprise at least one of:
    an SSID;
    password data;
    identification data;
    channel selection data;

medium select data;
encryption format data;
power saving configuration data;
VLAN configuration data;
secure channel information; and
quality of service control data.

13. The method of claim 8, further comprising transmitting a system configuration message to change or reset a network key for the wireless network.

14. The method of claim 8, further comprising managing handoff of a serviced wireless client to a second communications device of the wireless network via communications with the second communications device via the PLC communications interface.

15. A communications device comprising:
a wireless communications interface;
a power line carrier (PLC) communications interface;
processing circuitry coupled to the wireless communications interface and to the PLC communications interface, the processing circuitry, in combination with at least one of the wireless communications interface and the PLC communications interface operable to:
send a request for wireless communications interface operational parameters via the PLC communications interface;
receive a response via the PLC communications interface, the response including wireless communications interface operational parameters corresponding to a wireless network;
listen for transmissions of at least one Wireless Access Point (WAP) of the wireless network;
when transmissions of the at least one the WAP of the wireless network meets a service threshold, receive data service via the wireless communications interface; and
when the transmissions of the at least one the WAP of the wireless network fail to meet the service threshold, receive data service via the PLC communications interface.

16. The communications device of claim 15, wherein the processing circuitry is further operable to enable the wireless communications interface to service data service for at least one other communications device.

17. The communications device of claim 16, wherein the processing circuitry is further operable to enable the wireless communications interface to provide data service as a WAP of the wireless network.

18. The communications device of claim 17, wherein the processing circuitry is further operable to transmit its wireless communications interface operational parameters to potential client devices.

19. The communications device of claim 15, wherein the processing circuitry is further operable to coordinate transmit power of the wireless communications interface with transmit power of other communications devices of the wireless network via power level coordination communication messages transmitted and received via the PLC communications interface.

20. A method for operating a communications device having a wireless communications interface, a power line carrier (PLC) communications interface, and processing circuitry coupled to the wireless communications interface and to the PLC communications interface, the method comprising:
sending a request for wireless communications interface operational parameters via the PLC communications interface;
receiving a response via the PLC communications interface, the response including wireless communications interface operational parameters corresponding to a wireless network;
listening for transmissions of at least one Wireless Access Point (WAP) of the wireless network;
when transmissions of the at least one the WAP of the wireless network meet a service threshold, receiving data service via the wireless communications interface; and
when the transmissions of the at least one the WAP of the wireless network fail to meet the service threshold, receiving data service via the PLC communications interface.

21. The method of claim 20, wherein the processing circuitry is further operable to enable the wireless communications interface to service data service for at least one other communications device.

22. The method of claim 21, wherein the processing circuitry is further operable to enable the wireless communications interface to provide data service as a WAP of the wireless network.

23. The method of claim 22, wherein the processing circuitry is further operable to transmit its wireless communications interface operational parameters to potential client devices.

24. The method of claim 20, wherein the processing circuitry is further operable to coordinate transmit power of the wireless communications interface with transmit power of other communications devices of the wireless network via power level coordination communication messages transmitted and received via the PLC communications interface.

* * * * *